United States Patent
Sorensen et al.

[11] 4,214,703
[45] Jul. 29, 1980

[54] AIRCRAFT ENGINE NOZZLE

[75] Inventors: Norman E. Sorensen, Saratoga; Eldon A. Latham, Sunnyvale, both of Calif.

[73] Assignee: The United States of America as represented by the Administrator of the National Aeronautics and Space Administration, Washington, D.C.

[21] Appl. No.: 23,436

[22] Filed: Mar. 23, 1979

[51] Int. Cl.³ .............................................. B64D 33/04
[52] U.S. Cl. .................................. 239/127.3; 60/264; 239/265.33
[58] Field of Search ...................... 239/265.33, 265.19, 239/265.11, 127.3; 60/264, 271

[56] References Cited

U.S. PATENT DOCUMENTS

| | | | |
|---|---|---|---|
| 2,487,588 | 11/1949 | Price | 239/127.3 |
| 3,005,308 | 10/1961 | Bader | 239/265.33 |
| 3,436,020 | 4/1969 | Duthion et al. | 239/265.33 |
| 3,642,209 | 2/1972 | Stahl | 239/265.33 |
| 3,897,001 | 7/1975 | Helmintoller, Jr. et al. | 239/265.23 |

*Primary Examiner*—Robert B. Reeves
*Assistant Examiner*—Michael J. Forman
*Attorney, Agent, or Firm*—Darrell G. Brekke; John R. Manning; Armand McMillan

[57] ABSTRACT

A variable area exit nozzle arrangement for an aircraft engine having a substantially reduced length and weight which comprises a plurality of longitudinally movable radial vanes and a plurality of fixed radial vanes, the movable radial vanes being alternately disposed with respect to the fixed radial vanes, and means for displacing the movable radial vanes along the longitudinal axis of the engine relative to said fixed radial vanes, said radial vanes radially extending across the main exhaust flow of the engine.

5 Claims, 7 Drawing Figures

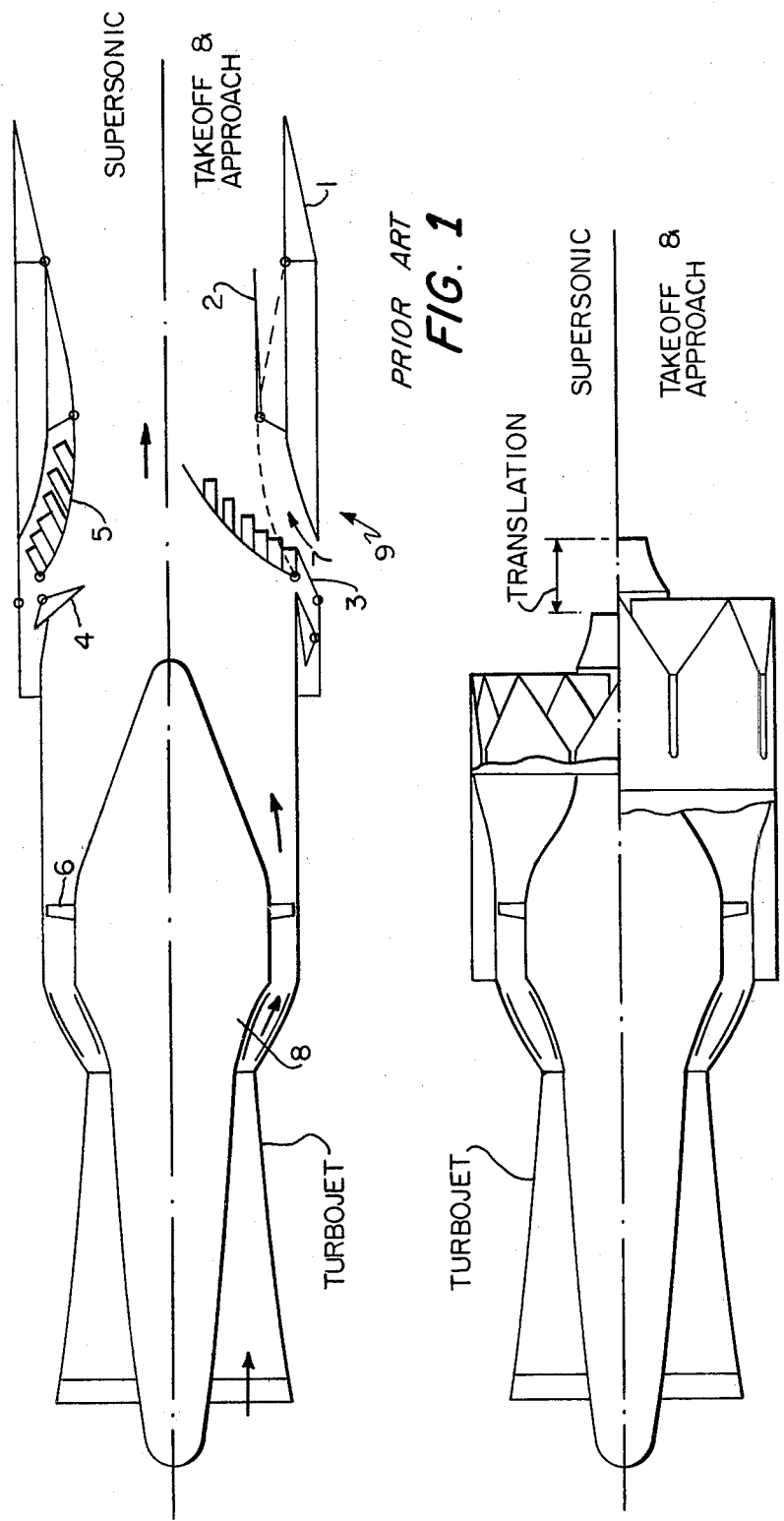

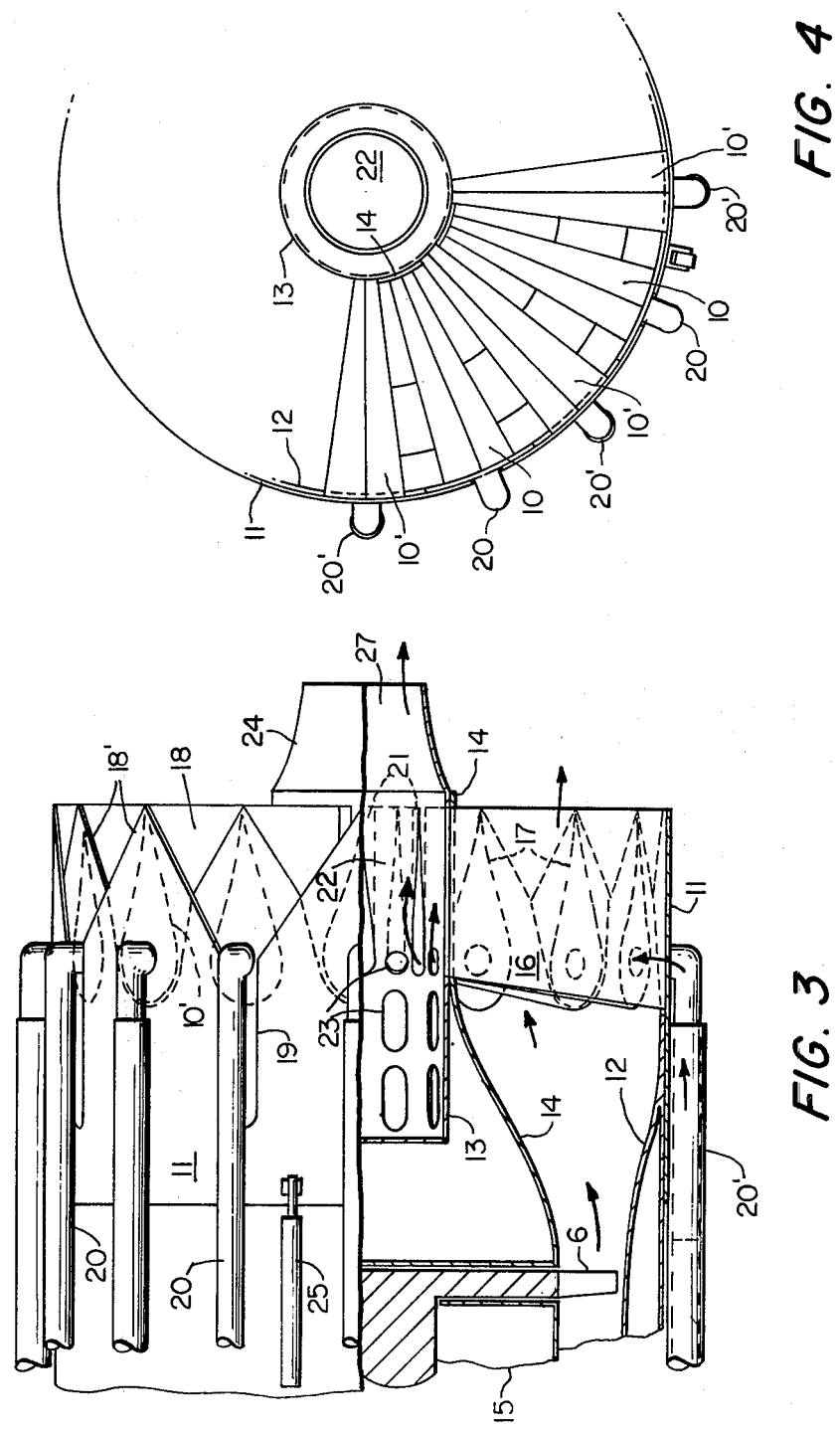

AIRCRAFT ENGINE NOZZLE

GOVERNMENT RIGHTS

The invention described herein was made by employees of the United States Government, and may be manufactured and used by or for the Government for governmental purposes without payment of any royalties thereon or therefor.

BACKGROUND OF THE INVENTION

1. Field of the Invention

The present invention is directed to a short, lightweight jet engine nozzle that will operate efficiently over the complete operating Mach number range of a supersonic aircraft or missile. More particularly, the present invention is directed to an engine which is provided with an arrangement for varying the area of the nozzle thereof for altering the exhaust characteristics of the engine nozzle structure in accordance with operation of an aircraft or missile within the subsonic and supersonic ranges.

2. Description of the Prior Art

An exemplary prior art engine-nozzle combinations is illustrated in FIG. 1 of the present application which shows a 1975 technology turbojet engine 8 and nozzle 9 combination. The nozzle 9 has many movable parts, among which are movable tail feathers 1, inner door flaps 2, outer door flaps 3, secondary air valves 4, and a noise suppressor 5. Movement of these elements allows the nozzle to operate efficiently at both supersonic and subsonic speeds with relatively low noise levels at takeoff and approach speeds. However, engine-nozzle combinations as shown in FIG. 1 suffer from a number of disadvantages including their long length and also the heavy weight of the nozzle. Furthermore, if sound suppression is required at takeoff and approach speeds, the weight and complexity of the suppressor 5 is also a disadvantage.

Other examples of the prior art include U.S. Pat. Nos. 3,005,308, 3,897,001 and 3,642,209. All of the inventions in these patents have, in common with the present invention, translating nozzle parts to vary the nozzle exit area. U.S. Pat. No. 3,005,308, issued to Bader, shows a nozzle with alternate translating segments that vary the area of a conventional convergent-divergent nozzle. The variable area nozzle arrangement of the Bader patent can best be seen in FIG. 3 which shows a plurality of vane segments 26 to 34, said vane segments being divided into two sets which include alternate members thereof. A first set of such segments include members 27, 29, 31 and 33, which are fixed, whereas a second set of segments which include segment members 26, 28, 30, 32 and 34 is axially, translatably movable with respect to the fixed segments. However, the nozzle disclosed in the Bader patent is much longer than that of the present invention, and thus does not achieve the shortness in length and light weight of the engine of the present invention. Also, increasing the number of translating segments does not change the overall length of the engine of the Bader patent. In addition, when the segments are translated from their "all-together" position, the nozzle is no longer smooth, but has many sharp corners and steps which lead to poor aerodynamic performance.

U.S. Pat. No. 3,897,001, issued to Helmintoller, Jr., et al, merely pertains to an inlet engine nozzle system wherein the nozzles shown therein are of the well-known plug nozzle type. The plug translates to vary the exit nozzle and is, of course, much longer than the nozzle of the present invention and accordingly, is much heavier than the nozzle of the present invention.

U.S. Pat. No. 3,642,209, issued to Stahl, shows a nozzle configuration which has little in common with the present invention since the outer sleeves thereof translate to vary the exit area. In addition, the nozzle, as shown, is only a convergent nozzle wherein the exit area is the minimum area, and thus is suitable for only subsonic and low supersonic applications.

SUMMARY OF THE INVENTION

Accordingly, it is an object of the present invention to provide a short, light-weight, engine nozzle that will operate efficiently over the complete operating Mach number range of a supersonic aircraft or missile.

Another object of the present invention is to provide a new and improved nozzle wherein certain nozzle elements thereof can be translated to vary the nozzle exit area, said translated and stationary elements forming a smooth, continuous surface at all translated positions, thereby not adversely affecting the aerodynamic performance of the engine.

A further object of the present invention is to provide a new type of multivane, convergent-divergent nozzle, which is much shorter than the prior art nozzles, the shortness of the nozzle being directly related to the number of vanes contained within the nozzle.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

FIG. 1 shows an engine-nozzle combination which is illustrative of the prior art;

FIG. 2 incorporates the present invention which illustrates the much shorter, overall length of the engine-nozzle combination when compared to the prior art. Of course, such a reduction in length will also reflect a substantial reduction in overall weight;

FIG. 3 shows the nozzle of the present invention in its supersonic operating (design) position;

FIG. 4 is an axial view of the nozzle of FIG. 3;

DETAILED DESCRIPTION OF THE INVENTION

Figure 6:
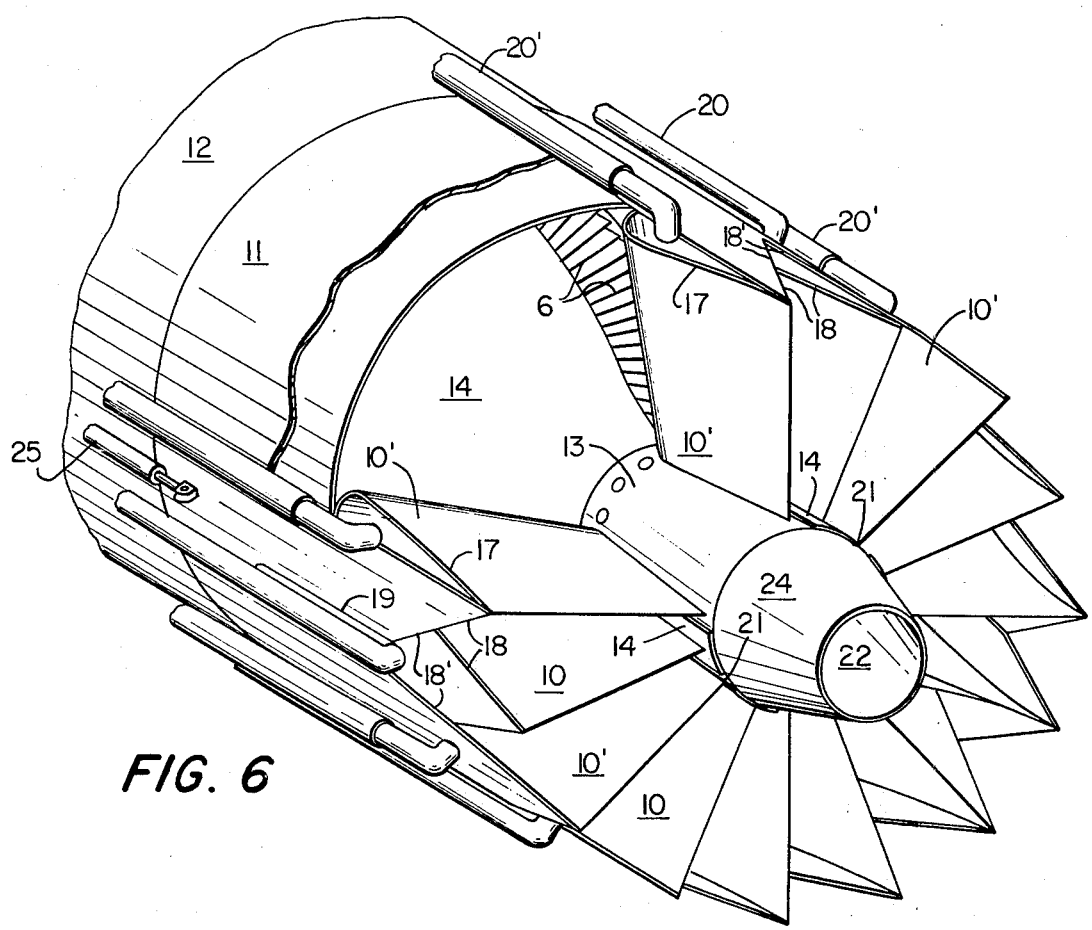
FIG. 6 is a cut-away perspective view of the nozzle of the present invention in its supersonic design Mach number operating position with all of the vanes together.

The main advantages of the present invention are shown in FIG. 2 which illustrates the substantial reduction in overall length which can be achieved by the present invention when compared to the prior art engine-nozzle combinations as shown in FIG. 1. As a matter of fact, supersonic configuration of the engine-nozzle combination of the present invention represents about a 71% reduction in length when measured from the turbine buckets 6 when compared to the prior art engines. Such a reduction in length also represents a substantial reduction in weight, including a greatly reduced overhanging weight. Also, because of its shorter length, the nozzle of the present invention has a lower radar cross-section. In addition, at take-off and landing speeds, a certain amount of sound suppression should be available from natural mixing of the external and internal airflows, as will be explained hereinbelow. Furthermore, in contrast to the prior art, the nozzle of the present invention only translates to provide variable geometry for efficient operation at both supersonic and subsonic speeds.

FIG. 3 shows the nozzle of the present invention in its supersonic operating design position. The nozzle is formed mainly by tapered, radial vanes 10 and 10', for example 16 in number, extending from the translating outer sleeve 11 and the main body 12 to the translating inner sleeve 13 and the main inner body 14. Vanes 10' are attached to the outer sleeve 11 and inner sleeve 13 so that 10', 11 and 13 translate as a unit. Similarly, vanes 10 are attached to the main body 12 and the main inner body 14 so that elements 10, 12 and 14 are fixed relative to the jet engine 15. Hot gas flow from the turbine buckets 6 passes through throats 16 of the nozzles formed by contours 17 of vanes 10 and 10'. The saw-tooth cutouts 18, which can be 16 in number, follow the final Mach rhombus of the extended exit hot gas flow since the flow is fully expanded aft of the forward edges 18' of the cutouts 18. The forward edges 18' of the outer sleeve 11 extend to eight slots 19 which allows translation of the outer sleeve 11 without interference with the fixed tubes 20. Also, the forward edges 18' of the main body 12 extend around translating vanes 10' allowing free translation. Similarly, slots 21 in the main inner body 14 extend around vanes 10' allowing free translation.

Since nozzle cooling is usually required, sixteen tubes 20 and 20' direct high-pressure cooling air from the forward compressor stages or from the inlet ahead of the engine through the hollow vanes 10 and 10' into chamber 26 through ports 23 communicating with the open ends of fixed vanes 10, through the open ends of translating vanes 10', and exiting through secondary nozzle 27 which also efficiently expands the cooling air flow for maximum thrust generation. Surfaces 24 can also further expand the main nozzle flow. Since the outer sleeve 11 translates in the aft direction for low-speed operation, every other tube 20' must telescope for free translation.

Figure 5:
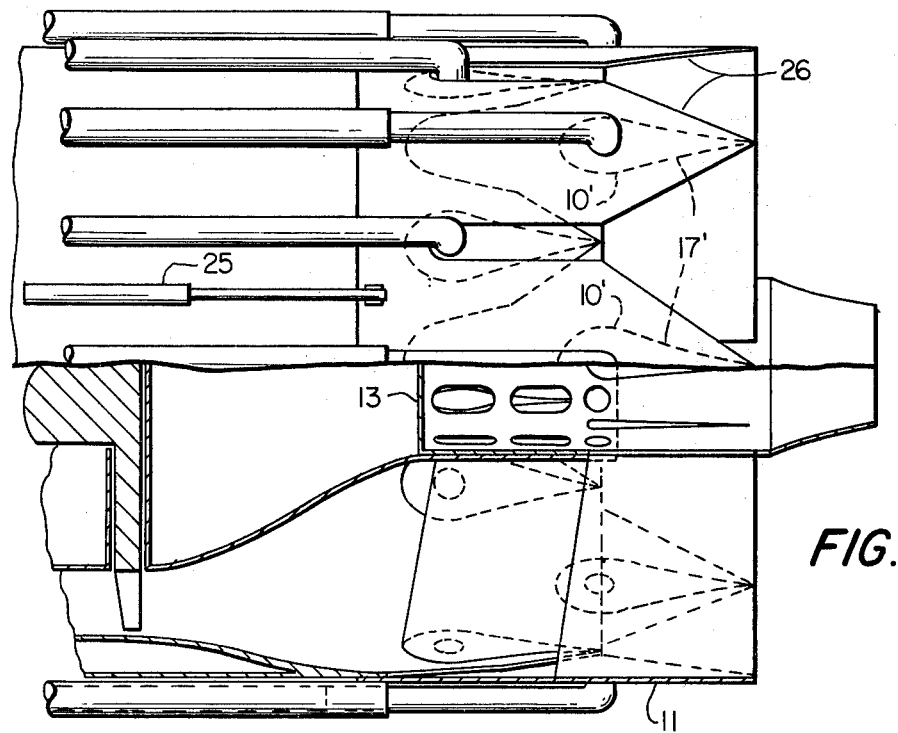
FIG. 5 shows the nozzle of the present invention in its takeoff and approach geometry.

FIG. 5 shows the nozzle in its take-off and approach geometry. Outer sleeve 11, vanes 10' and inner sleeve 13 are translated aft by four equally spaced actuators 25 so that contours 17' now form the nozzle from the outer contours of translating vanes 10'. V-shaped cutouts 26 allow outer air flow around the nozzle to be entrained in the nozzle main exhaust flow, acting much like passageway 7 shown in FIG. 1. However, now a vortex pattern of flow is formed in the V's 26, thus providing sound suppression.

Figure 7:
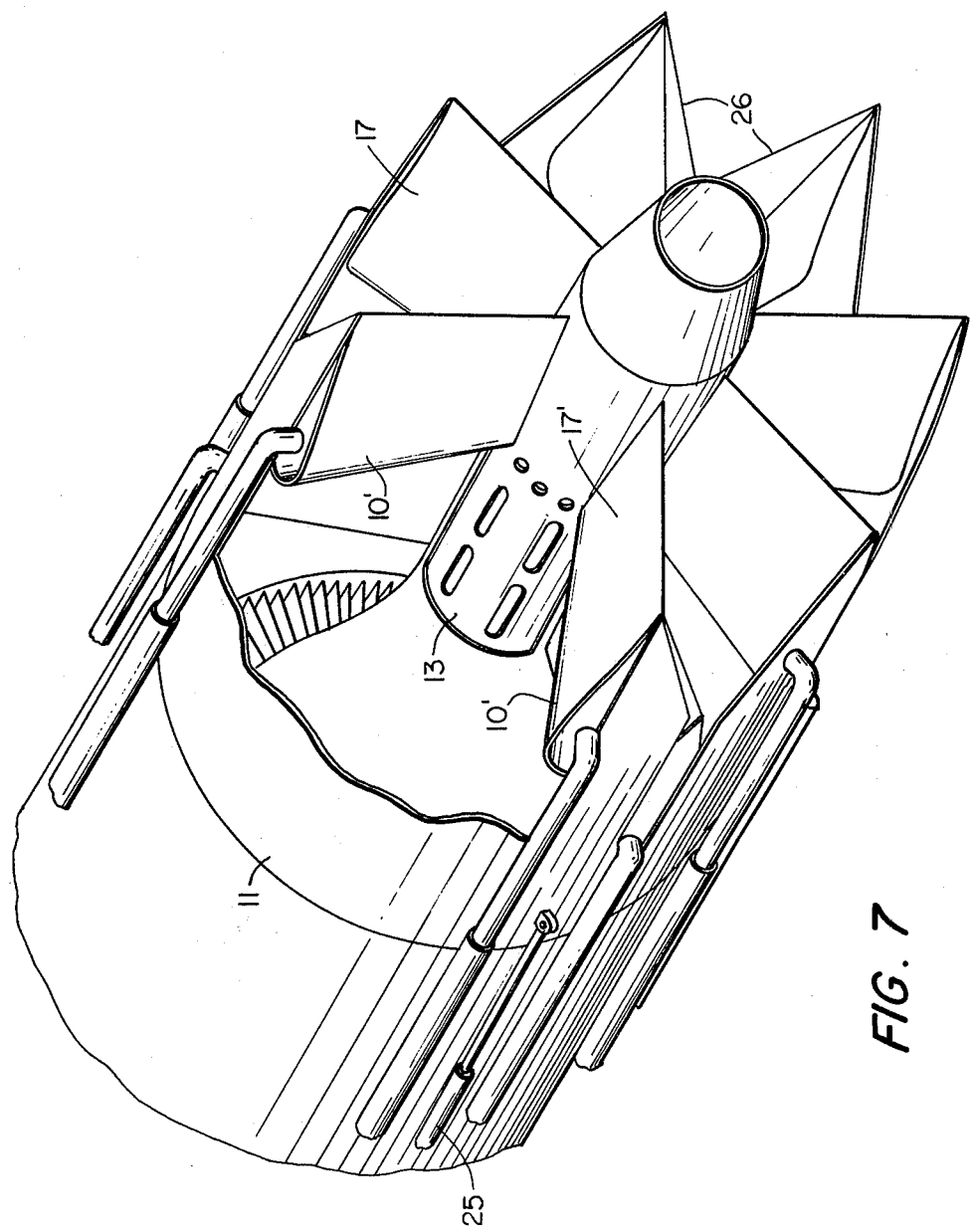
FIG. 7 is a cut-away perspective view of the nozzle of the present invention in its subsonic and transonic operating position with every other vane translated in the aft direction.

FIG. 6 is a cut-away perspective view of the nozzle of the present invention in its supersonic operating position with all of the vanes together, and FIG. 7 is a cut-away perspective view of the nozzle of the present invention in the subsonic and transonic operating position with every other vane translated in the aft direction. By comparing FIG. 6 with FIG. 7, it can be readily seen that by merely translating every other vane of the nozzle, the throat area can be changed.

Alternate embodiments of the present invention can employ any number of vanes greater than four. Each time the number of vanes is doubled, the nozzle length is halved. Thus, the present invention is concerned with a multiple-vane, convergent-divergent nozzle which is much shorter than that of the prior art. Also, the translated and stationary vanes of the present invention form smooth, continuous surfaces at all translated positions, thus contributing to an advantageous aerodynamic performance.

The invention being thus described, it will be obvious that the same may be varied in many ways. Such variations are not to be regarded as a departure from the spirit and scope of the invention, and all such modification as would be obvious to one skilled in the art, are intended to be included within the scope of the following claims.

We claim:

1. A variable area exit nozzle arrangement for an aircraft engine having a substantially reduced length and weight which comprises a plurality of longitudinally movable radial vanes and a plurality of fixed radial vanes, the movable radial vanes being alternately disposed with respect to the fixed radial vanes, and means for displacing the movable radial vanes along the longitudinal axis of the engine relative to said fixed radial vanes, said radial vanes radially extending across the main exhaust flow of the engine and each having a taper in the downstream direction whereby the exit nozzle area is varied when the movable radial vanes are displaced with respect to the fixed radial vanes, said nozzle including a translating outer sleeve and a translating inner sleeve connected by said movable radial vanes and a fixed main outer body and fixed main inner body connected by said fixed radial vanes, said translating outer and inner sleeves and movable radial vanes moving as a unit relative to said fixed outer and inner bodies and said fixed radial vanes.

2. The variable area exit nozzle arrangement of claim 1, wherein the fixed and movable radial vanes are tapered from the outer sleeve and body to the inner sleeve and body, respectively.

3. The variable area exit nozzle arrangement of claim 1, wherein a plurality of fixed tubes and a plurality of movable tubes provide communication between said fixed radial vanes and movable radial vanes, respectively, and engine bleed air for cooling said vanes.

4. The variable area exit nozzle arrangement of claim 3, wherein the outer sleeve is provided with a plurality of longitudinally disposed slots to accommodate said plurality of movable tubes during the longitudinal translation of said outer and inner sleeves.

5. The variable area exit nozzle arrangement of claim 1, wherein the fixed main inner body defines an inner chamber which communicates with the fixed radial vanes and movable radial vanes through apertures provided in said main inner body and translating inner sleeve.

* * * * *